(12) United States Patent
Nijland et al.

(10) Patent No.: US 10,843,427 B2
(45) Date of Patent: Nov. 24, 2020

(54) JOINING DEVICE AND METHOD FOR JOINING STRIPS TO FORM A TIRE COMPONENT

(71) Applicant: VMI Holland B.V., Epe (NL)

(72) Inventors: Gerrit Roy Nijland, Epe (NL); Jeroen Van Tienhoven, Epe (NL); Hugo Bart Zandbergen, Epe (NL); Cornelis-Jan Otto, Epe (NL); Karel Johannes Van Assenbergh, Epe (NL); Otte Haitsma, Epe (NL); Pieter Cornelis Meijers, Epe (NL)

(73) Assignee: VMI HOLLAND B.V.

( * ) Notice: Subject to any disclaimer, the term of this patent is extended or adjusted under 35 U.S.C. 154(b) by 0 days.

(21) Appl. No.: 16/462,475

(22) PCT Filed: Nov. 2, 2017

(86) PCT No.: PCT/NL2017/050704
§ 371 (c)(1),
(2) Date: May 20, 2019

(87) PCT Pub. No.: WO2018/093248
PCT Pub. Date: May 24, 2018

(65) Prior Publication Data
US 2019/0270265 A1 Sep. 5, 2019

(30) Foreign Application Priority Data
Nov. 18, 2016 (NL) .................................. 2017821

(51) Int. Cl.
*B29D 30/42* (2006.01)
*B29C 65/78* (2006.01)
(Continued)

(52) U.S. Cl.
CPC .......... *B29D 30/42* (2013.01); *B29C 65/7802* (2013.01); *B29C 65/7841* (2013.01);
(Continued)

(58) Field of Classification Search
CPC ........ B29D 2030/424; B29D 2030/425; B29D 2030/426; B29D 2030/427; B29D 2030/423; B29D 2030/428; B29C 66/1162
See application file for complete search history.

(56) References Cited

U.S. PATENT DOCUMENTS 3,325,328 A 6/1967 Henley .......................... 156/157
3,682,222 A 8/1972 Alderfer ....................... 152/361
(Continued)

FOREIGN PATENT DOCUMENTS

EP 0554947 8/1993 ............ B65H 19/10
JP S4982786 8/1974 ............ B29C 53/00
(Continued)

OTHER PUBLICATIONS

Japanese Office Action (w/translation) issued in application No. 2018-540818, dated Aug. 7, 2019 (4 pgs).
(Continued)

*Primary Examiner* — Mark A Osele
(74) *Attorney, Agent, or Firm* — Hayes Soloway P.C.

(57) ABSTRACT

Disclosed is joining device for joining a trailing end of a first strip to a leading end of a second strip to form a tire component. The joining device includes a support member with a support surface and a retaining member with a retaining surface for retaining the second strip. The joining device is arranged for positioning the leading end of the second strip in a joining orientation in which said leading end is closer to the support plane than the rest. The joining device also includes a control unit for controlling a relative (Continued)

movement between the support member and the retaining member with a first component in a placement direction to place the leading end of the second strip and a second component in a joining direction to bring the leading end of the second strip into contact with the trailing end of the first strip.

25 Claims, 13 Drawing Sheets

(51) Int. Cl.
  *B29C 65/00* (2006.01)
  *B29L 30/00* (2006.01)
(52) U.S. Cl.
  CPC ...... *B29C 65/7847* (2013.01); *B29C 66/1142* (2013.01); *B29C 66/1162* (2013.01); *B29C 66/14* (2013.01); *B29C 66/435* (2013.01); *B29C 66/71* (2013.01); *B29C 66/7212* (2013.01); *B29C 66/72141* (2013.01); *B29C 66/73752* (2013.01); *B29C 66/8161* (2013.01); *B29C 66/8322* (2013.01); *B29C 66/8324* (2013.01); *B29D 2030/422* (2013.01); *B29D 2030/424* (2013.01); *B29D 2030/426* (2013.01); *B29D 2030/427* (2013.01); *B29D 2030/428* (2013.01); *B29L 2030/003* (2013.01)

(56) References Cited

U.S. PATENT DOCUMENTS

| | | | |
|---|---|---|---|
| 3,778,329 A | 12/1973 | Alderfer | ............ 161/47 |
| 3,802,982 A * | 4/1974 | Alderfer | |
| 3,933,565 A | 1/1976 | Printz et al. | ............ 156/266 |
| 4,026,753 A | 5/1977 | Printz et al. | ............ 156/502 |
| 6,280,556 B1 | 8/2001 | Okada et al. | ............ 156/264 |

FOREIGN PATENT DOCUMENTS

| | | | |
|---|---|---|---|
| JP | S5311723 | 4/1978 | ............ B29C 47/02 |
| JP | 2000159399 | 6/2000 | ............ B29D 30/30 |
| NL | 6403580 | 4/1965 | ............ B29C 65/00 |
| WO | WO9924244 | 5/1999 | ............ B29D 30/42 |
| WO | WO2011/099846 | 8/2011 | ............ B65H 35/00 |

OTHER PUBLICATIONS

Decision to Grant issued in related Japanese Patent Application Serial No. 2018-540818, dated Mar. 23, 2020 with translation (5 pages).
International Preliminary Report on Patentability issued in application No. PCT/NL2017/050704, dated May 21, 2019 (6 pgs).
International Search Report and Written Opinion issued in application No. PCT/NL2017/050704, dated Apr. 11, 2018 (9 pgs).

* cited by examiner

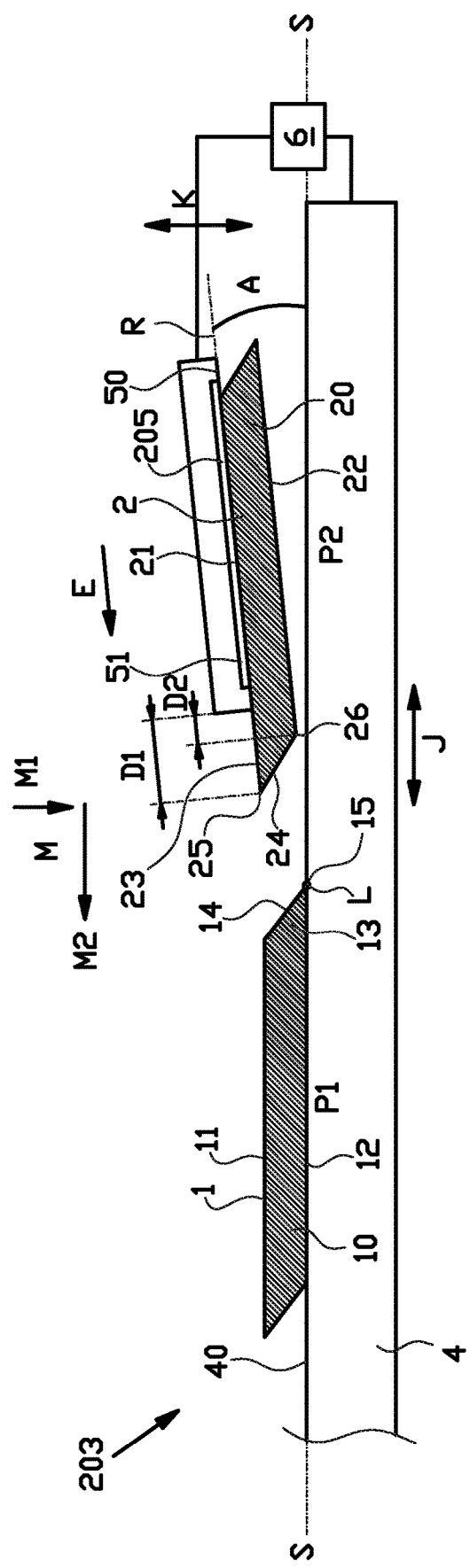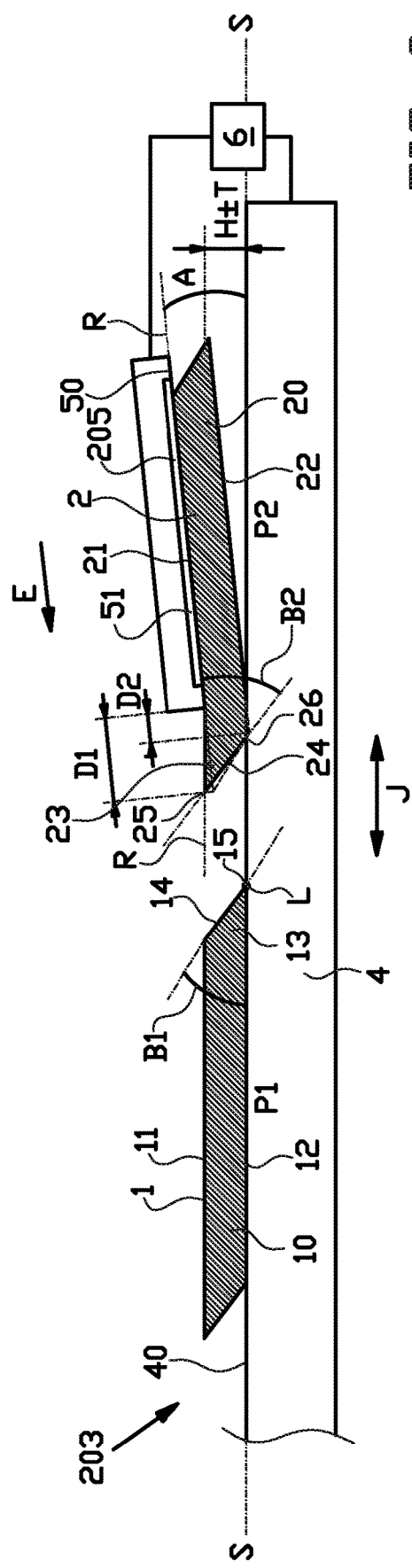

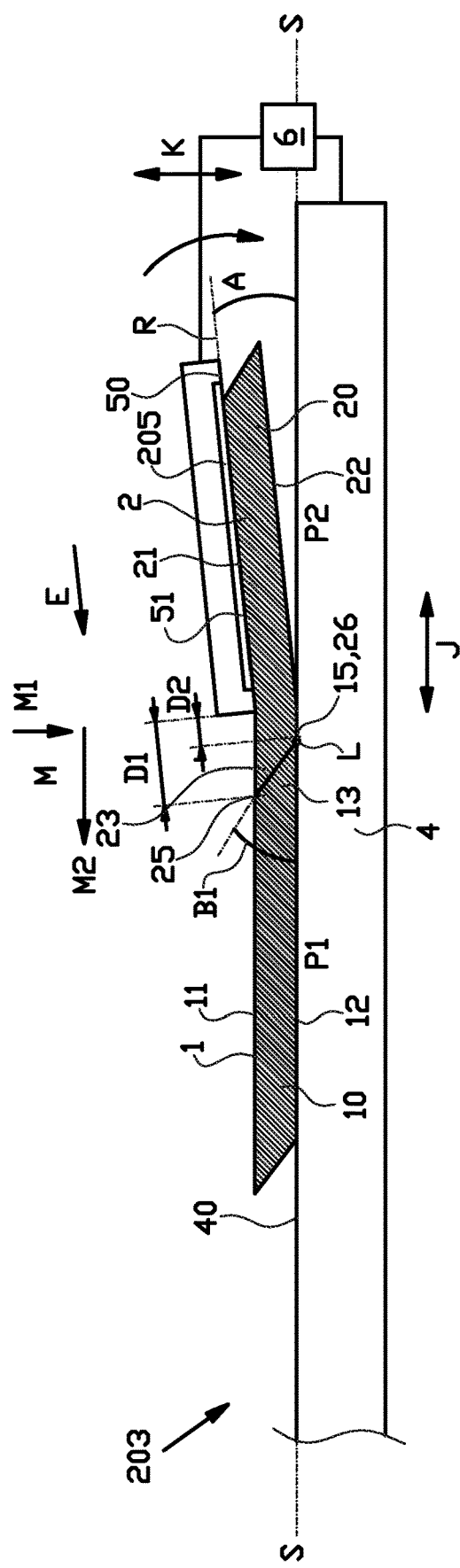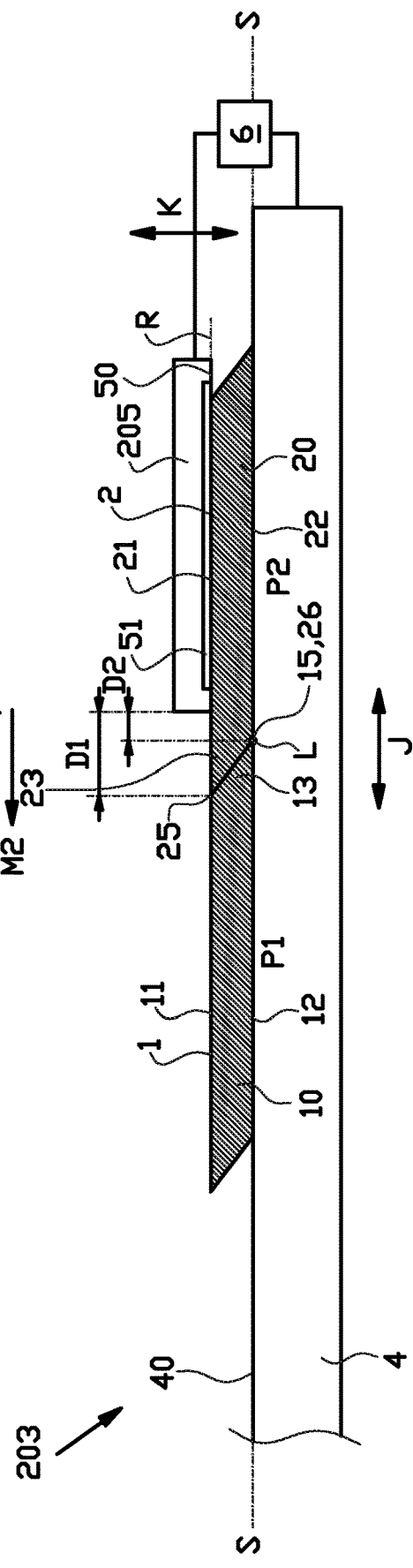

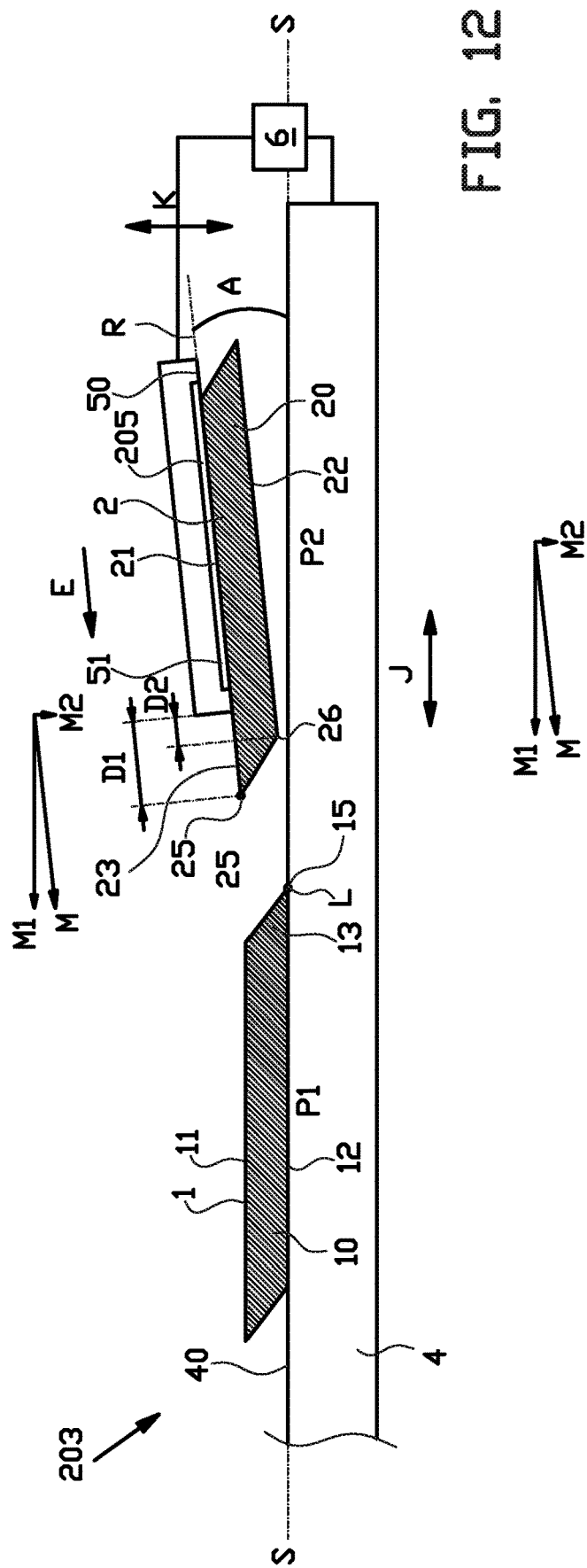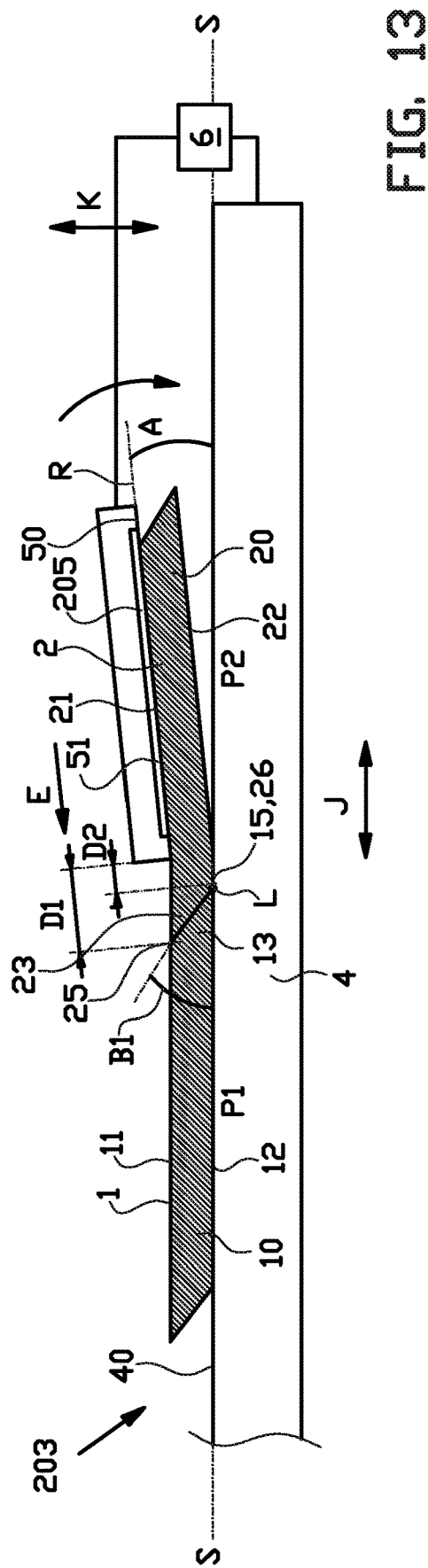

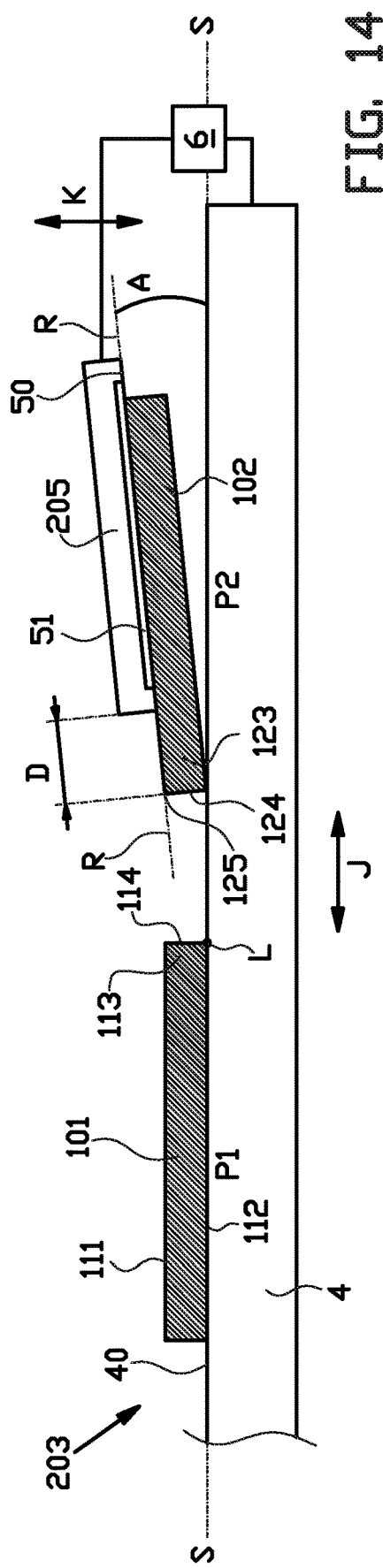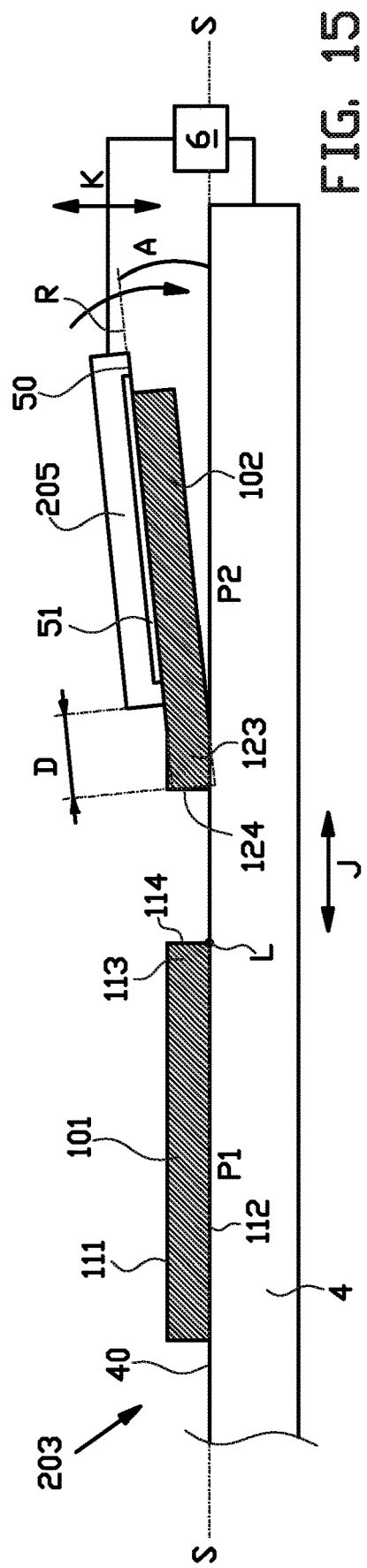

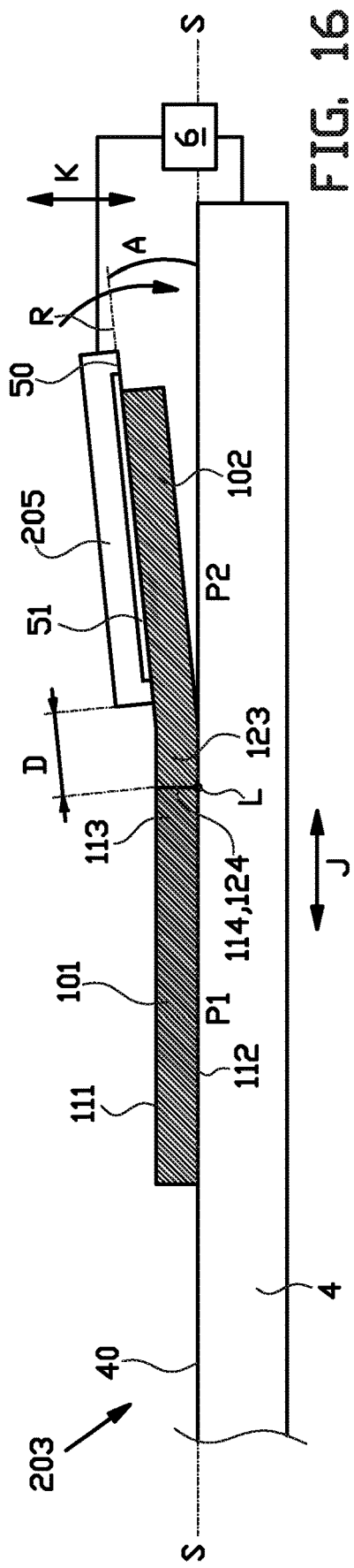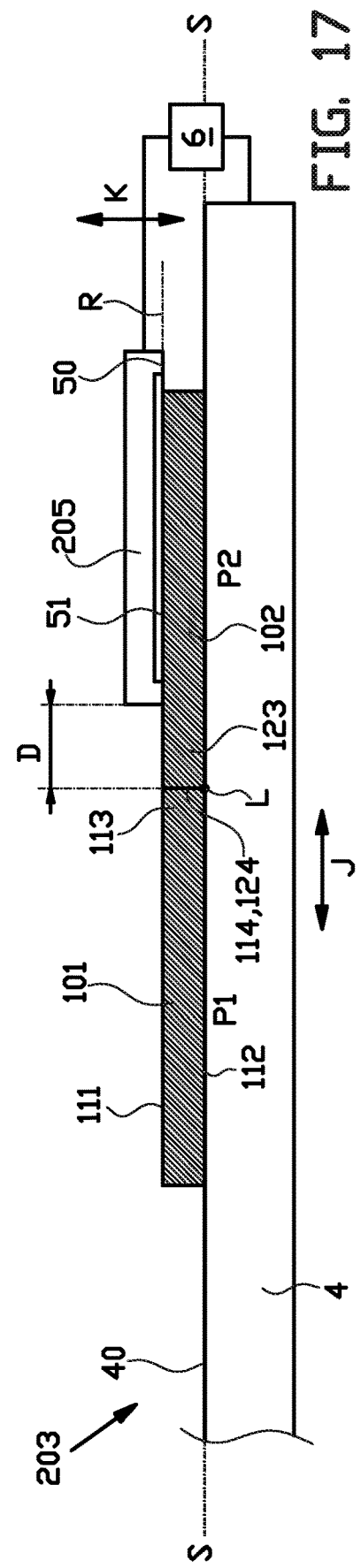

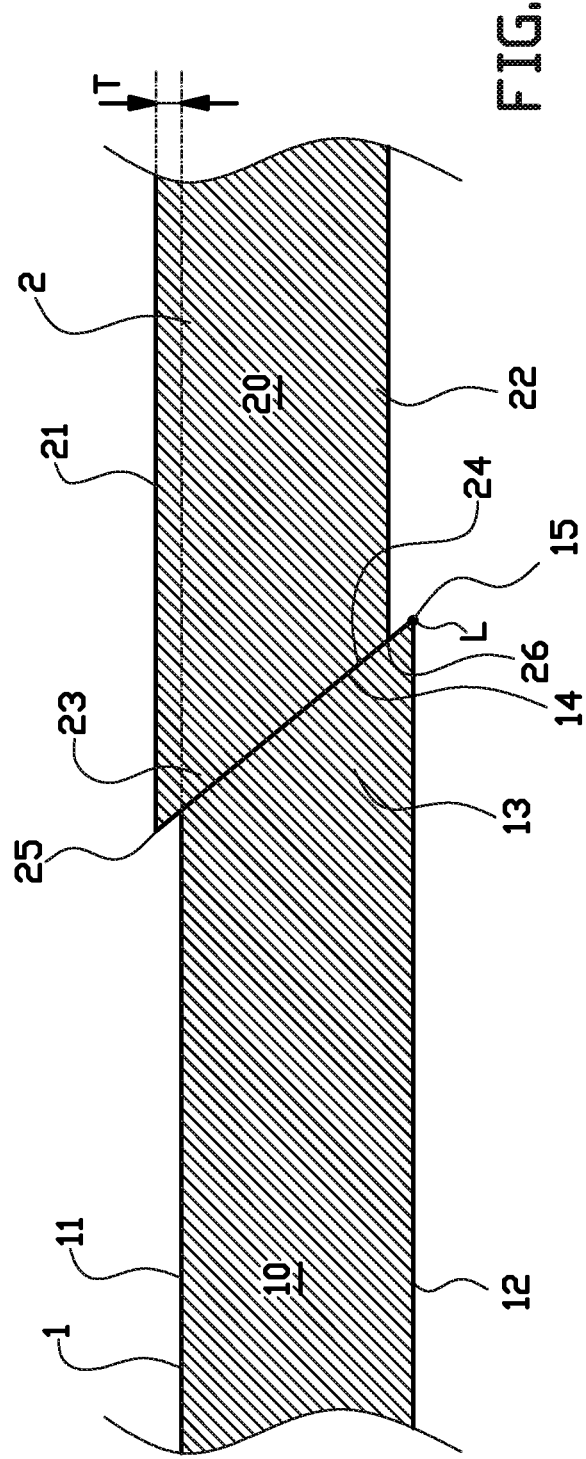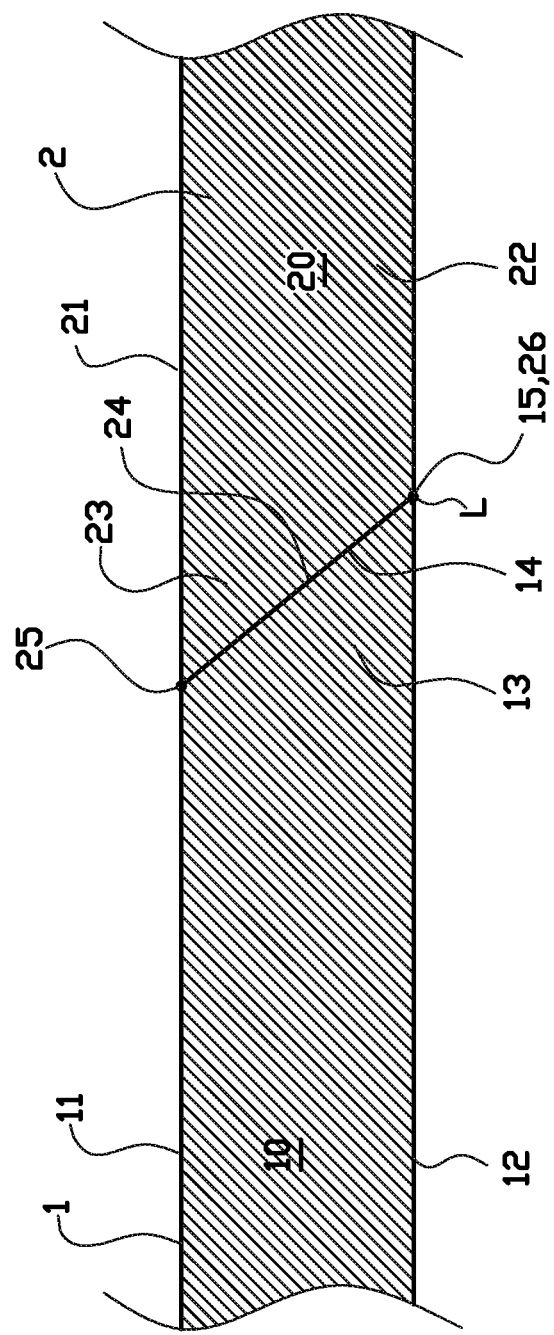

JOINING DEVICE AND METHOD FOR JOINING STRIPS TO FORM A TIRE COMPONENT

BACKGROUND

The invention relates to a joining device and a method for joining strips to form a tire component.

WO 2011/099846 A1 discloses a method for manufacturing a tyre from spliced strips, wherein the first strip is cut and the strip is placed on a discharge conveyor. After cutting the first strip a second strip is cut and placed on the discharge conveyor. After that the first and second strip are spliced. Between cutting the first strip and placing the second strip on the discharge conveyor the second strip is retained over the discharge conveyor, the projected separation distance between an end of the first strip and an end of the second strip to be spliced to said end is measured, and based on the measured separation distance the first strip is relatively displaced such with respect to the second strip that the end of the first strip is placed in the wanted position with respect to the second strip, after which the second strip is placed on the discharge conveyor.

The method above allows for accurately joining the first strip to the second strip in the direction of conveyance of the discharge conveyor. However, tolerances buildup between the discharge conveyor and the gripper that retains the second strip is inevitable. In the height direction tolerance buildup of up to 0.5 millimeters is not uncommon. With some strips being only a few tenths of a millimeter in height, such tolerance buildup is unacceptable. Moreover, if the strips are joined with a so-called 'beveled splice', a misalignment of the overlapping second strip with respect to the first strip on the discharge conveyor may cause a sharp edge protruding from the surface of the strips at the joint, as for example shown in FIG. 18. Said protruding edge may cause deformations in subsequent tire layers that are to be applied to said surface.

It is an object of the present invention to a joining device and a method for joining strips to form a tire component, wherein the quality of the joining can be improved.

SUMMARY OF THE INVENTION

According to a first aspect, the invention provides a joining device for joining a trailing end of a first strip to a leading end of a second strip to form a tire component, wherein the joining device comprises a support member with a support surface for supporting the first strip and the second strip in a support plane in a first strip position and a second strip position, respectively, on opposite sides of a joining line and a retaining member with a retaining surface for retaining the second strip in a retaining plane extending above the support plane at the second strip position, wherein the retaining member is arranged for retaining the second strip to the retaining surface with the leading end projecting from the retaining member towards the first strip position over a first projecting distance in a projecting direction parallel to the retaining plane, wherein the joining device is arranged for positioning the leading end of the second strip in a joining orientation in which said leading end is closer to the support plane than the rest of the second strip, wherein the joining device comprises a control unit for controlling a relative movement between the support member and the retaining member, wherein the relative movement comprises a first component in a placement direction perpendicular to the support plane to place the leading end of the second strip in the joining orientation in contact with the support plane and a second component in a joining direction transverse to the joining line and parallel to the support plane to bring the leading end of the second strip in the joining orientation into contact with the trailing end of the first strip.

As a result of the oblique contact of the leading end of the second strip, said leading end is deflected and/or deformed by said support surface with respect to the rest of the second strip that is retained to the retaining member. In particular, said leading end can bend upwards slightly towards the top surface of the first strip. The retaining member can thus force said leading end into a tolerance free abutment with the support surface, such that the joining of the leading end at the freely projecting leading end of the second strip can be independent of and/or substantially tolerance free with respect to the retaining member. As a result, the second strip can lie close to or lie flush with the top surface of the first strip, even if the retaining member is at a different height as a result of tolerance build-up.

In a preferred embodiment the joining device comprises a deflection member for deflecting the leading end of the second strip towards the support member with respect to the rest of the second strip. The deflection member can ensure that leading end of the second strip is the only part of the second strip that is in a position to contact the support member first, free from the retaining member and the tolerances associated with said retaining member.

In a further embodiment the deflection member is movable in a deflection direction transverse or perpendicular to the retaining plane into a deflection position in which the deflection member at least partially protrudes from the retaining plane towards the support plane. By having the deflection member protrude through or from the retaining plane towards the support plane, the deflection member can deflect the leading end away from its original position in said retaining plane.

Preferably, the deflection member is biased to move into the deflection position, wherein the deflection member is movable against the bias in a retraction direction opposite to the deflection direction into a flush position in which the deflection member lies flush or substantially flush with the retaining plane. Unlike with a rigidly mounted or actively driven deflection member, the biased deflection member allows for the deflection member to move back when sufficient pressure has been applied to press the leading end against the support member. Hence, the leading end is not unnecessarily deformed or compressed between the deflection member and the support member.

Alternatively, the joining device comprises a deflection actuator that is operationally coupled to the deflection member for actively driving the movement of the deflection member in the deflection direction. The deflection actuator allows for accurate control of the position of the deflection member.

In another preferred embodiment the retaining plane is arranged to extend parallel or substantially parallel to the support plane when the leading end of the second strip is in the joining orientation. Hence, the leading end of the second strip can be made to extend below the retaining plane while the rest of the second strip extends is retained to the retaining member in the retaining plane, parallel or substantially parallel to the support plane. In other words, all of the second strip, apart from the leading end, is at a constant or substantially constant distance from the support plane.

Alternatively, the retaining member is positionable in an oblique joining position in which the retaining plane extends at an oblique joining angle relative to the support plane and declines towards the joining line. In this alternative embodiment, it is the oblique orientation that causes the leading end of the second strip to be closer to the support plane than the rest of the second strip.

Preferably, the control unit is arranged for first controlling the relative movement in the placement direction to place the leading end of the second strip in the joining orientation in contact with the support plane and subsequently controlling the relative movement in the joining direction to bring the leading end of the second strip in the joining orientation into contact with the trailing end of the first strip. It is therefore possible to first deflect the leading end of the second strip with respect to the support plane into alignment, free of tolerance build-up, with respect to the first strip, and only then closing the gap between the first strip and the second strip.

In the case of the retaining plane extending at an oblique joining angle, the control unit is arranged for simultaneously controlling the relative movement in the placement direction and the joining direction to move the retaining member along an oblique joining path at the oblique joining angle. Hence, the gap between the first strip and the second strip can be closed in the direction of said oblique joining angle.

Preferably, the joining angle is in a range of two to six degrees, preferably two to five degrees, most preferably three to four degrees. Said joining angle has proven to be optimal for obtaining a deformation at the leading end of the second strip that is independent or substantially independent from the tolerance build-up.

Again, when the retaining plane is at the oblique joining angle, it is preferred that the retaining member in the joining position is spaced apart from the support plane over a minimal height that is chosen such that the second strip contacts the support surface. Hence, the triangular relationship between the oblique joining angle, the first projecting distance and the minimal height is chosen carefully so that the second strip contacts the support surface when the retaining member is in the joining position.

Also, when the retaining plane is at the oblique joining angle in the joining position, it is preferred that the retaining member is movable from the joining position into a placement position, wherein the retaining plane extends parallel or substantially parallel to the support plane in the placement position. Hence, the leading end of the second strip can be brought into contact with the trailing end of the first strip simply and/or solely by moving the retaining member from the joining position to the placement position.

In an embodiment thereof the control unit is arranged for moving the retaining member from the joining position to the placement position only after the leading end of the second strip is in contact with the trailing end of the first strip. Once the leading end is in contact with the trailing end, the ends are less likely to shift with respect to each other. Hence, the movement from the joining position to the placement position does not affect the quality of the joining.

In another embodiment the trailing end of the first strip and the leading end of the second strip comprise complementary bevel end surfaces extending under the same or substantially the same bevel angle with respect to the support plane and the retaining plane, respectively, wherein the relative movement between the retaining member and the support member is arranged for deflecting the leading end with respect to the support surface over the first projecting distance into the joining orientation in which the bevel end surfaces of the first strip and the second strip are parallel or substantially parallel. Hence, the second strip can be brought into the same orientation as the first strip.

In a preferred embodiment thereof the second strip comprises a top surface, wherein the bevel end surface meets with the top surface to form a leading edge, wherein the retaining member is arranged for retaining the second strip with the leading edge thereof projecting from the retaining member in the projecting direction over the first projection distance. Hence, the leading edge projects furthest from the retaining member.

In a further embodiment thereof the second strip comprises a bottom surface, wherein the bevel end surface meets with the bottom surface to form a recessed edge, wherein the retaining member is arranged for retaining the second strip with the recessed edge thereof projecting from the retaining member in the projecting direction over a second projection distance. Hence, said recessed edge at the bottom surface can be deflected by contact with the support surface at a position at the second projection distance from the retaining member. The normal force exerted by the support surface onto the second strip can be exerted at the position of said recessed edge where the leading end is not held by and/or already freely projects from the retaining member. Hence, the leading end can be more easily deflected and deformed towards the first strip.

In general, it is preferred that the first projecting distance is at least two millimeters, preferably at least five millimeters and most preferably at least ten millimeters. It is a trend in the tire building industry that the strips used for body plies are becoming thinner and thinner. Body plies with a thickness of less than one millimeter are not uncommon. The aforementioned projecting distance is sufficient to allow for a deformation of said leading end of the second strip with respect to the rest of the second strip that is retained by the retaining member.

Referring to the embodiment that introduced the second projection distance, it is preferred that the second projection distance is at least one millimeter, preferably at least three millimeters and more preferably at least seven millimeters. By having such a projection distance, it can be ensured that the leading end of the second strip has enough freedom with respect to the rest of the second strip that is retained to the retaining member to deflect and/or deform upon contact with the support plane in the placement direction.

In general, it is preferred that either the support member is movable in the joining direction with respect to the retaining member or that the retaining member is movable in the joining direction with respect to the support member. Only one of the retaining member and the support member thus needs to be movable, while the other can remain in the same position as the gap between the first strip and the second strip is closed.

According to a second aspect, the invention provides a method for joining a trailing end of a first strip to a leading end of a second strip to form a tire component, wherein the method comprises the steps of:

providing a support member with a support surface and supporting the first strip in a support plane on the support surface in a first strip position on one side of a joining line;

providing a retaining member with a retaining surface and retaining the second strip to said retaining surface in a retaining plane extending above a second strip position at the support plane on an opposite side of the joining line, wherein the second strip is retained to the retaining surface with the leading end projecting from the retaining member towards the first strip position over a first projecting distance in a projecting direction parallel to the retaining plane;

positioning the leading end of the second strip in a joining orientation in which said leading end is closer to the support plane than the rest of the second strip; and controlling a relative movement between the support member and the retaining member, wherein the relative movement comprises a first component in a placement direction perpendicular to the support plane to place the leading end of the second strip in the joining orientation in contact with the support plane and a second component in a joining direction transverse to the joining line and parallel to the support plane to bring the leading end of the second strip in the joining orientation into contact with the trailing end of the first strip.

The method and its embodiments relate to the practical implementation of the technical features as discussed previously in relation to the joining device. It will be apparent to one skilled in the art that the advantages of the method and its embodiments correspond to the advantages of the joining device and its respective embodiments. The advantages will not be repeated hereafter for reasons of conciseness.

In a preferred embodiment the method comprises the step of deflecting the leading end of the second strip towards the support member with respect to the rest of the second strip.

In a further embodiment the retaining plane extends parallel or substantially parallel to the support plane when the leading end of the second strip is in the joining orientation.

Preferably, the relative movement is first controlled in the placement direction to place the leading end of the second strip in the joining orientation in contact with the support plane and is subsequently controlled in the joining direction to bring the leading end of the second strip in the joining orientation into contact with the trailing end of the first strip.

In an alternative embodiment the retaining member is positioned in an oblique joining position in which the retaining plane extends at an oblique joining angle relative to the support plane and declines towards the joining line.

In a preferred embodiment thereof the relative movement is simultaneously controlled in the placement direction and the joining direction to move the retaining member along an oblique joining path at the oblique joining angle.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which:

FIGS. 8-11 show side views of a further alternative joining device during steps of a further alternative method for joining strips to form a tire component according to a third embodiment of the invention;

FIGS. 12 and 13 show side view of the joining device according to FIGS. 8-11 during a further alternative method for joining strips to form a tire component according to a fourth embodiment of the invention;

FIGS. 14-17 show side views of the joining device according to FIGS. 8-11 during steps of a further alternative method for joining strips to form a tire component according to a fifth embodiment of the invention;

FIG. 18 shows a beveled splice that is the result of a conventional joining method; and FIG. 19 shows a beveled splice that is the result of the joining method according to the embodiments of the invention.

DETAILED DESCRIPTION OF THE INVENTION

Figure 1:
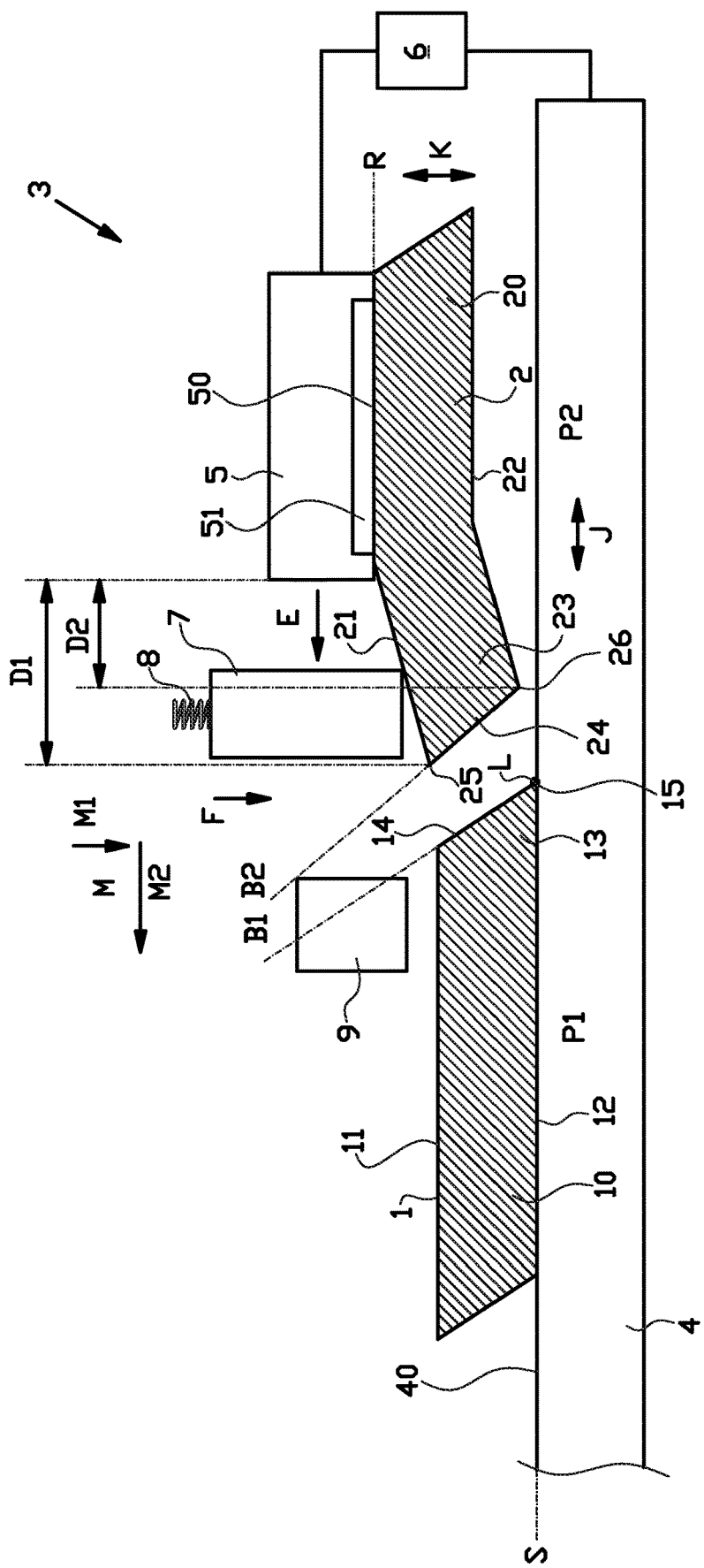
FIGS. 1-4 show side views of a joining device during steps of a method for joining strips to form a tire component according to a first embodiment of the invention.

FIGS. 1-4 show a joining device 3 according to the invention during the steps of a method according to a first embodiment of the invention for joining, pressing or splicing a first strip 1 to a second strip 2 to form a tire component.

The tire component is preferably a breaker ply or a body ply for building a green or unvulcanised tire. The first strip 1 comprises a strip body 10 with a top surface 11, a bottom surface 12, a trailing end 13 and a bevel end surface 14 that meets with the bottom surface 12 at a first bevel angle B1 to form a trailing edge 15. The second strip 2 comprises a strip body 20, a top surface 21, a bottom surface 22, a leading end 23 and a bevel end surface 24 that meets with the top surface 21 and the bottom surface 22 at a second bevel angle B2 to form a leading edge 25 and a recessed edge 26 respectively. The bevel angles B1, B2 of the respective strips 1, 2 are the same or substantially the same. The strip bodies 10, 20 are typically manufactured from unvulcanized, green and/or sticky elastomeric material which adheres easily. In the case of a breaker ply, the strips 1, 2 comprise embedded reinforcement cords, preferably steel reinforcement cords. The joining device 3 is arranged for joining, pressing or splicing the trailing end 13 of the first strip 1 to the leading end 23 of the second strip 2 at their respective bevel end surfaces 14, 24 to form a so-called 'beveled splice'.

As shown in FIG. 1, the joining device 3 comprises a support member 4, e.g. a table or a conveyor, with a support surface 40, preferably a planar support surface 40, for supporting the first strip 1 and the second strip 2 in a support plane S in or at a first strip position P1 and a second strip position P2, respectively, on opposite sides of a joining line L. The joining device 3 further comprises a retaining member 5, e.g. a gripper or another suitable manipulator, with a retaining surface 50, preferably a planar retaining surface 50, for retaining the second strip 2 in a retaining plane R extending above the support plane S at the second strip position P2. The retaining member 5 is provided with retaining elements 51, preferably in the form of vacuum retaining elements or magnetic retaining elements, to retain the second strip 2 to the retaining surface 50. The joining device 3 is arranged for positioning the leading end 23 of the second strip 2 in a joining orientation, as shown in FIG. 1, in which said leading end 23 is closer to the support plane S than the rest of the second strip 2, in a manner that will be elucidated in more detail directly hereafter.

The retaining member 5 is positioned relative to the support member 4 via one or a chain of mechanical components (not shown), e.g. the segments of a mechanical guide, a mechanical arm, a robotic manipulator or the like. These mechanical components inevitably cause a tolerance buildup in the positioning of the retaining member 5 relative to the support member 4. Said tolerance buildup is shown schematically in FIG. 2 as a positive or a negative tolerance T with respect to a minimal height H of the retaining plane R above the support plane S.

Figure 4:
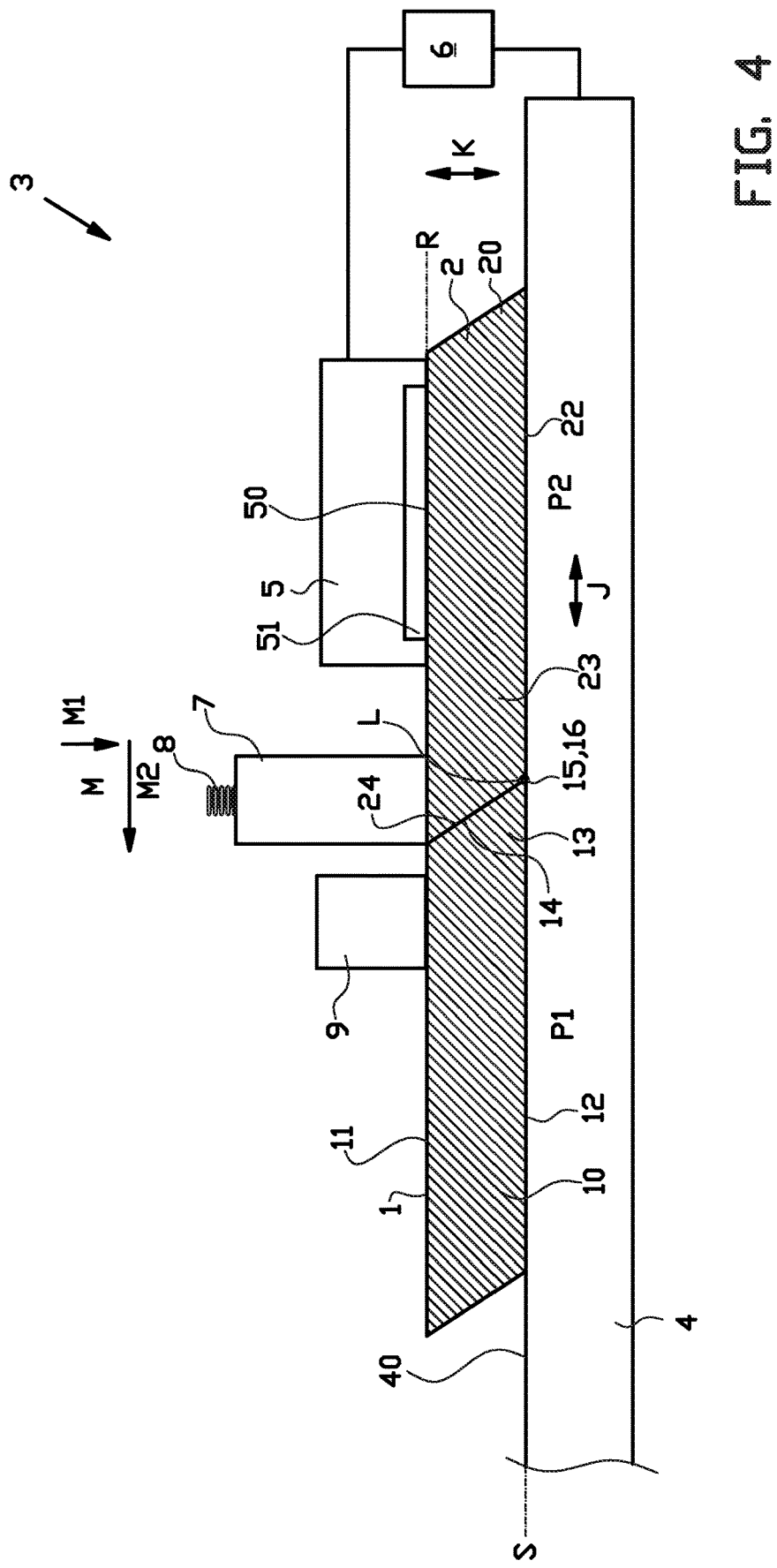

To cancel out the tolerance buildup T, the joining device 3 is provided with a deflection member 7 for deflecting the leading end 23 of the second strip 2 towards the support member 4 with respect to the rest of the second strip 2. The deflection member is movable in a deflection direction F transverse or perpendicular to the retaining plane R into a deflection position, as shown in FIG. 1, in which the deflection member 7 at least partially protrudes from or below the retaining plane R towards the support plane S. In this first embodiment of the invention, the deflection member 7 is biased to move into the deflection position as shown in FIG. 1 by a biasing member 8, e.g. a spring or a resilient abutment element. This allows for the deflection member 7 to be movable against the bias in a retraction direction opposite to the deflection direction F into a flush position, as shown in FIG. 4, in which the deflection member 7 lies flush or substantially flush with the retaining plane R.

Figure 2:
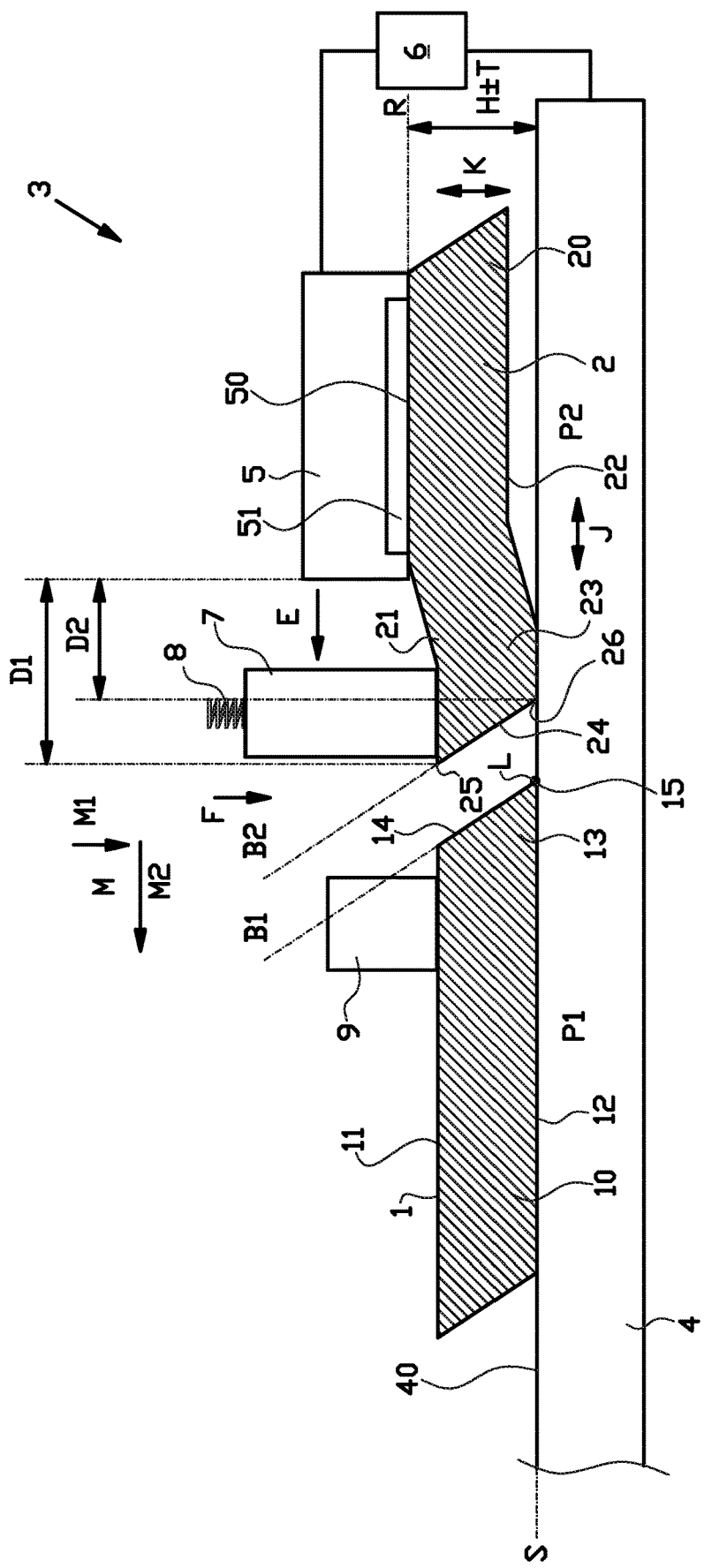

By deflecting the leading end 23 of the second strip 2, said leading end 23 is closer to the support plane S than the rest of the second strip 2. When the deflected leading end 23 of the second strip 2 is subsequently laid down onto the support surface 40 at the support plane S, as shown in FIG. 2, the leading end 23 is at least partially deflected back into alignment with the trailing end 13 of the first strip 1. Unlike the rest of the second strip 2 that is still retained to the retaining member 5 above the support plane S, the leading end 23 is placed securely and accurately on the support plane S independently from the tolerance buildup of the retaining member 5.

As shown in FIGS. 1 and 2, the joining device 3 may be provided with a movable fixator 9 to hold-down and/or fix the position of the trailing end 13 of the first strip 1 on or with respect to the support surface 40 of the support member 4. The fixator 9 is shown in a release position in FIG. 1 and in a fixating position in FIG. 2. Depending on whether the fixator 9 is independently supported or supported with respect to the retaining member 5, the fixator 9 may used solely to hold-down the first strip 1, while the fixator 9 may move in a direction parallel to the joining direction J over said first strip 9.

The joining device 3 is arranged for providing a relative movement M between the support member 4 and the retaining member 5. The relative movement M comprises a first component M1 in a placement direction K perpendicular to the support plane S to place the leading end 23 of the second strip 2 in the joining orientation in contact with the support plane S and a second component M2 in a joining direction J oblique or transverse to the joining line L to bring the leading end 23 of the second strip 2 in the joining orientation into contact with the trailing end 13 of the first strip 1.

In this exemplary embodiment, the joining direction J is parallel or substantially parallel to the support plane S. The placement direction K is perpendicular to the support plane S. The first component M1 and the second component M2 of the relative movement M can for example be provided by moving the support member 4 relative to the retaining member 5 or by moving the retaining member 5 relative to the support member 4.

The joining device 3 is further provided with a control unit 6 that is operationally and/or electronically connected to the support member 4 and/or the retaining member 5 for controlling the components M1, M2 of the aforementioned relative movement M in the joining direction J and the placement direction K.

The method for joining the trailing end 13 of the first strip 1 to the leading end 23 of the second strip 2 with the use of the aforementioned joining device 3 is elucidated below with reference to FIGS. 1-4.

FIG. 1 shows the situation in which the retaining member 5 is positioned above the support plane S with the second strip 2 retained thereto. The retaining member 5 is at a height relative to the support member 4 such that the second strip 2 is above the second strip position P2, clear of the support plane S. The first strip is placed on the support member 4 in the first strip position P1, on the opposite side of the joining line L with respect to the second strip position P2. The biased deflection member 7 is in the deflection position thereby deflecting the leading end 23 of the second strip 2 into the joining orientation.

FIG. 2 shows the situation after the controlled first component M1 of the relative movement M between the retaining member 5 and the support member 4 in the placement direction K, thereby causing the deflected leading end 23 to approach, contact and deflect against the support surface 40 of the support member 4. The deflection with respect to the support surface 40 causes the leading end 23 of the second strip 2 to align with the trailing end 13 of the first strip 1 prior to joining. Note that in particular the bevel end surfaces 14, 24 of the respective strips 1, 2 are parallel or substantially parallel to each other and/or that the bottom surface 22 of the second strip 2 at the leading end 23 has been forced into an orientation parallel or substantially parallel to the support plane S. In FIG. 2, the first strip 1 and the second strip 2 are still spaced apart.

Figure 3:
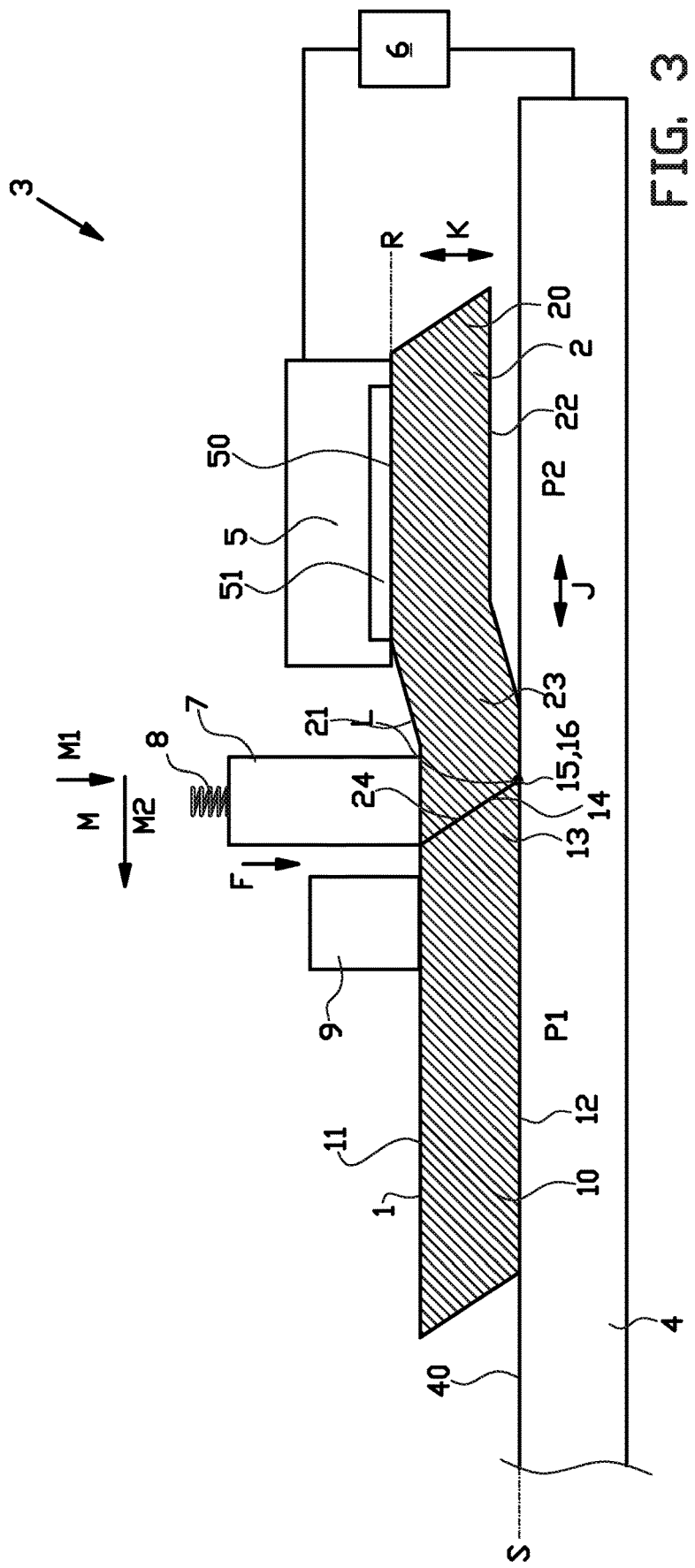

FIG. 3 shows the situation after the controlled second component M2 of the relative movement M between the retaining member 5 and the support member 4 in the joining direction J to close the gap between the first strip 1 and the leading end 23 of the second strip 2. Note that the retaining member 5 still retains the rest of the second strip 2 above and clear from the support plane S.

FIG. 4 shows the situation after a controlled laying down of the rest of the second strip 2 by providing a further relative movement between the retaining member 5 and the support member 4 in the placement direction K until the bottom surface 22 of the second strip 2 is laid down on the support surface 40 of the support member 4 at the support plane S. Alternatively, the second strip 2 may simply be dropped by deactivating the retaining functionality of the retaining elements 51.

Figure 7:
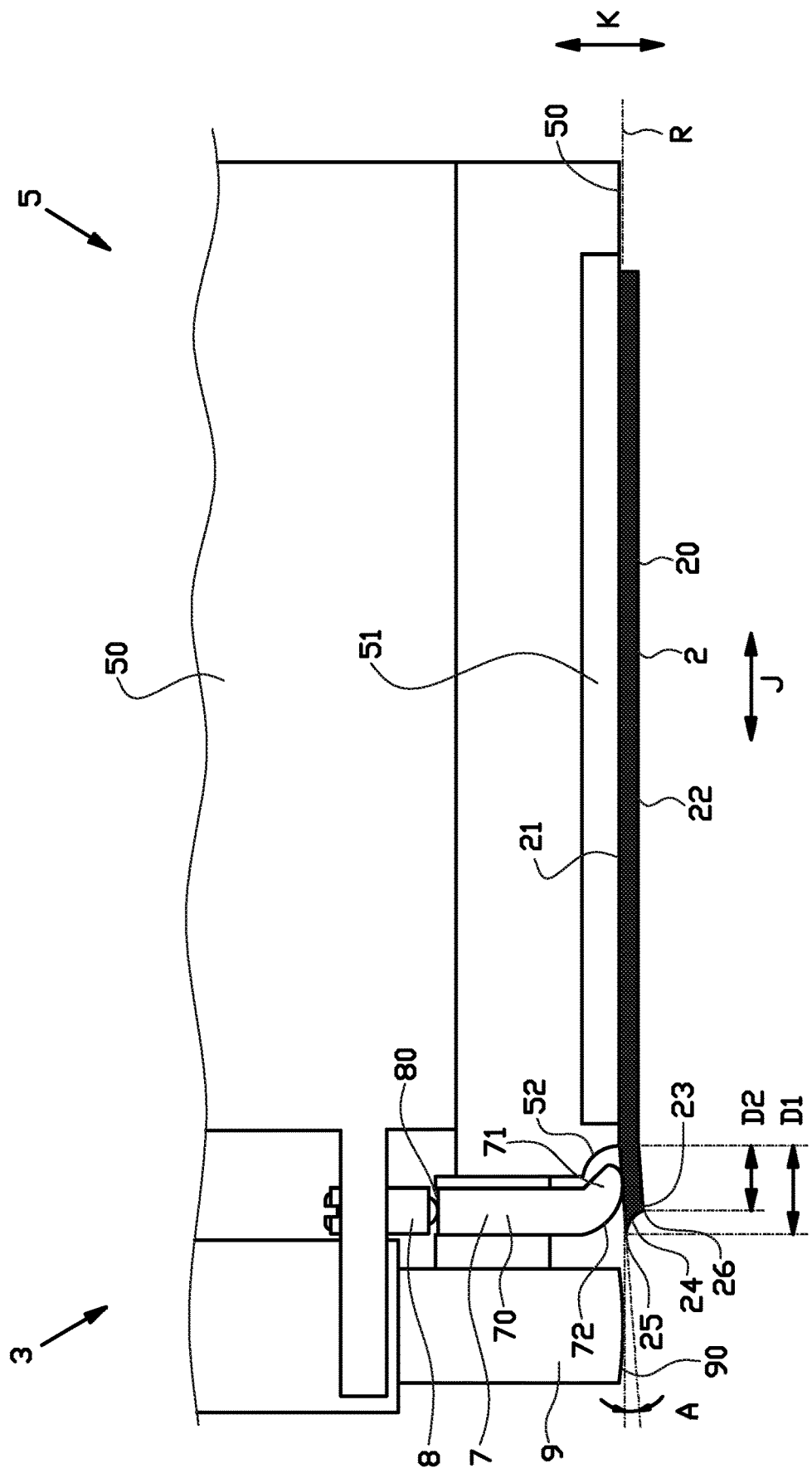
FIG. 7 shows a side view of the joining device according to FIGS. 1-4.

FIG. 7 shows the joining device 3 according to the first embodiment of the invention in more detail. These details are by no means limiting for the more general description of the joining device 3 above. As shown in FIG. 7, the deflection member 7 may be provided with a main body 70 and an extension 71 extending from the main body 70 towards the retaining member 5 to minimize the distance between the deflection member 7 and the retaining elements 51. In particular, the unretained part of the second strip 2 between the retaining elements 51 and the deflection member 7 should be kept to a minimum. To this end, it is preferred that also the retaining member 5 is provided with a recess 52 to accommodate and/or receive the extension 71 of the deflection member 7 as close as possible to the retaining elements 51. In this exemplary embodiment, the side of the deflection member 7 facing away from the retaining member 5 is provided with a curvature 72 to allow for at least a part of the leading end 23 of the second strip 2 to deflect upwards again upon contact of said leading end 23 with the support surface.

FIG. 7 further shows the biasing member 8 as a resiliently compressible point contact 80, e.g. through a ball or bushing, as an alternative to the schematically depicted spring 8 in FIGS. 1-4. The biasing member 8 is preferably supported on or mounted to the retaining member 5. Hence, the biasing member 8 is arranged for biasing the deflection member 7 with respect to the retaining member 5.

FIG. 7 further shows that the fixator 9 is supported on or mounted to the retaining member 5 and thus is arranged to move together with said retaining member 5 in the joining direction J. The fixator 9 has a contact surface 90 that is slightly convex to have minimal contact with the first strip. The contact surface should be minimal to allow for the contact surface 90 to slide over the first strip with minimal friction when moving together with the retaining member 5.

It can be further observed in FIG. 7 that the angle A and the resulting deflection over the projecting distances D1, D2 is very minimal. In reality, the strips 1, 2 are only a few tenths of a millimeter in thickness and very small deflection, e.g. less than a millimeter, can already be sufficient to ensure that the leading end 23 of the second strip 2 contacts the support surface while the rest of the second strip 2 remains clear of said support surface. Hence, the deflection in FIGS. 1-4 is exaggerated solely to illustrate the effects of the invention and FIG. 7 gives a more realistic impression of the actual deflections.

Figure 5:
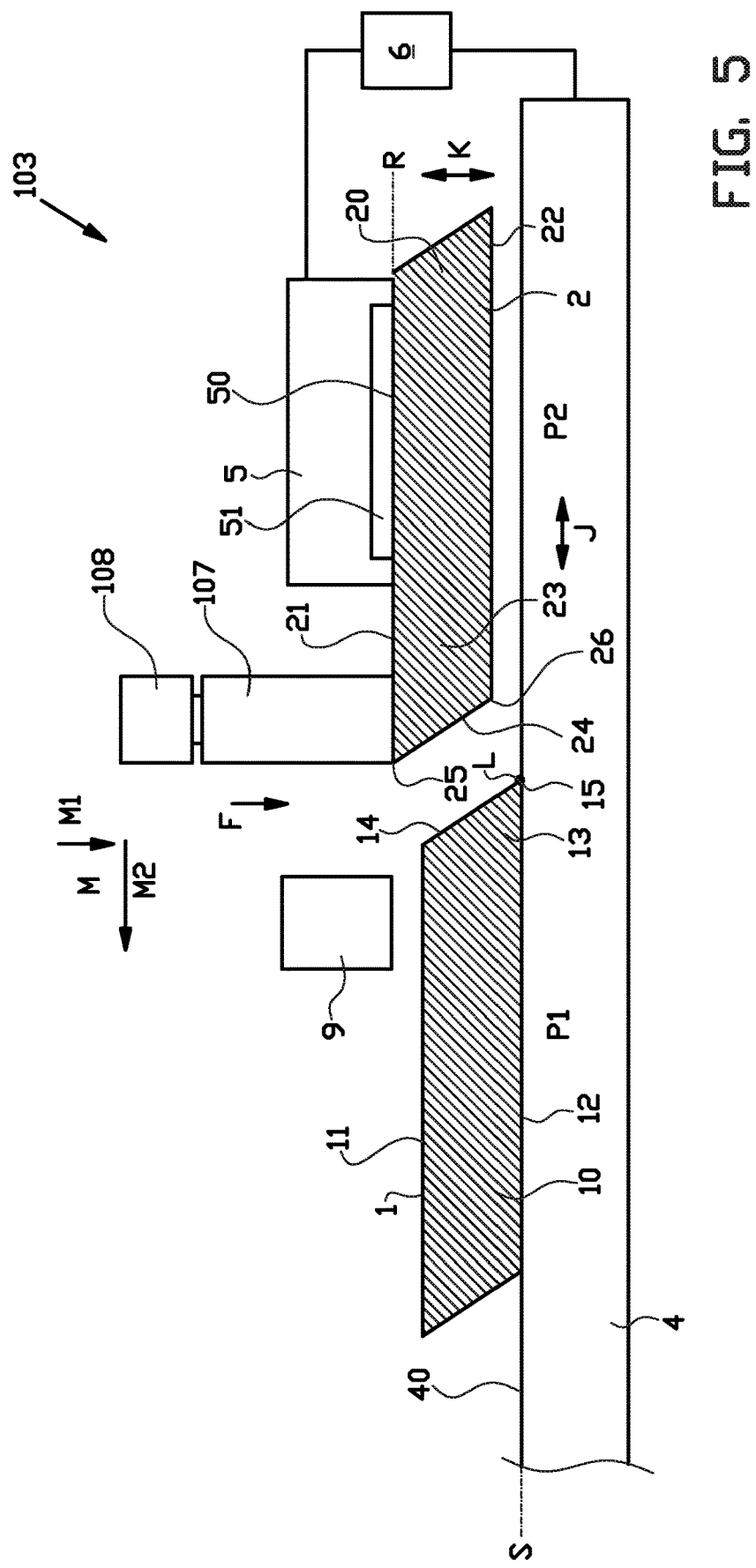
FIGS. 5 and 6 show side views of an alternative joining device during steps of an alternative method for joining strips to form a tire component according to a second embodiment of the invention.
Figure 6:
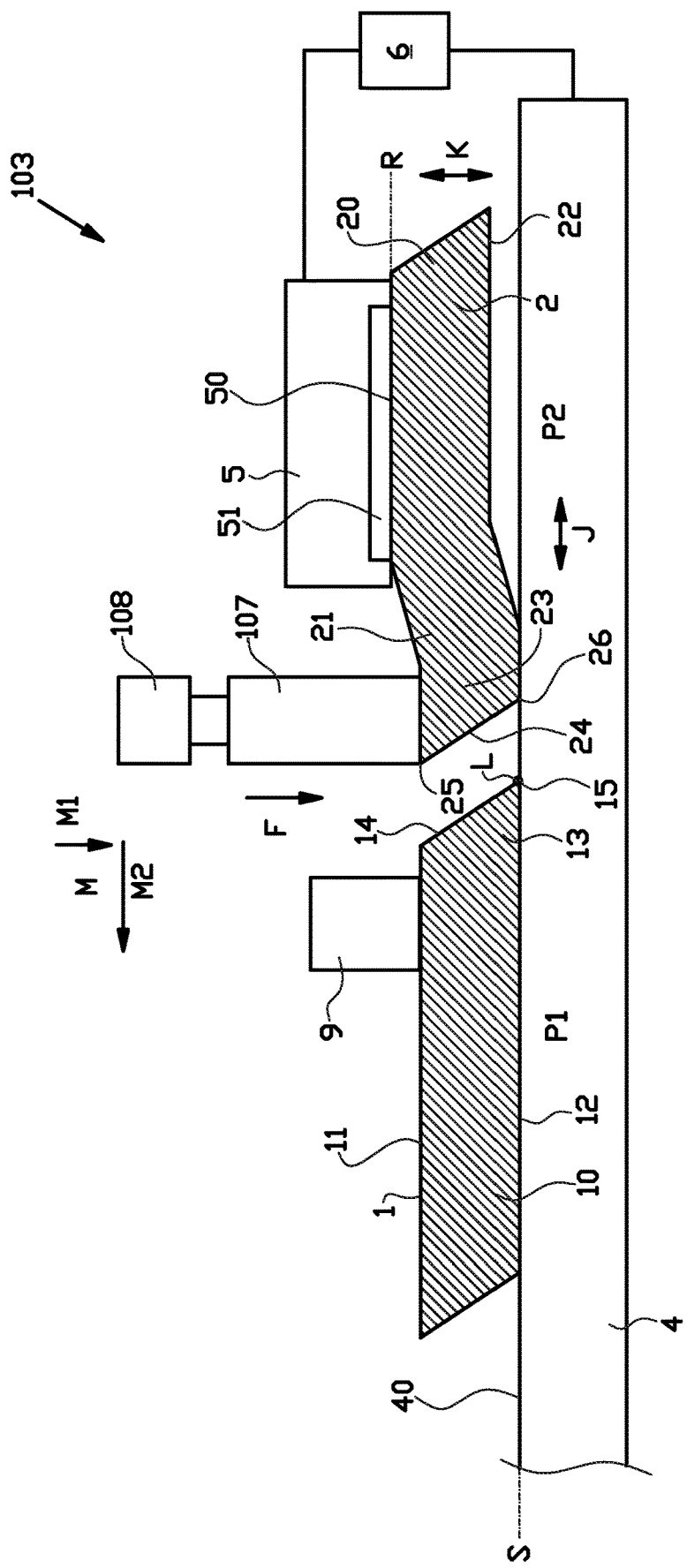

FIGS. 5 and 6 show an alternative joining device 103 according to a second embodiment of the invention. The alternative joining device 103 differs from the previously discussed joining device 3 in that the deflection member 107 is actively controlled. More in particular, the alternative joining device 103 comprises an alternative deflection actuator 108 that is operationally coupled to the deflection member 107 for actively driving the movement of the deflection member 107 in the deflection direction F between the flush position of FIG. 5 and the deflection position of FIG. 6.

FIGS. 8-11 show a further alternative joining device 203 according to a fifth embodiment of the invention. The further alternative joining device 203 differs from the previously discussed joining devices 1, 103 in that it comprises an alternative retaining member 205 without a deflection member. Instead, the leading end 23 of the second strip 2 is allowed to freely project from the alternative retaining member 205 over the first projecting distance D1 in the projecting direction E. The alternative retaining member 205 is positionable in a joining position, as shown in FIG. 8, in which the retaining plane R extends above the second strip position P2 and declines or descends towards the joining line L under an oblique joining angle A with respect to the support plane S. The joining angle A is slightly exaggerated in the drawings to clearly demonstrate the invention. In practice, the joining angle A is preferably in a range of two to six degrees, preferably two to five degrees, most preferably three to four degrees. The alternative retaining member 205 is spaced apart from the joining line L so that there is still a gap between the trailing end 13 of the first strip 1 and the leading end 23 of the second strip 2 in the joining direction J. The alternative retaining member 205 is sufficiently spaced apart from the support surface 40 in the placement direction K such that the second strip 2 is free from, spaced apart from and/or not in contact with said support surface 40.

The first projecting distance D1, measured from the leading edge 25 to the alternative retaining member 205, is preferably at least two millimeters, more preferably at least five millimeters and most preferably at least ten millimeters. The freely extending part of the second strip 2 can be deformed with respect to the rest of the second strip 2 that is retained to the alternative retaining member 205 over said first projecting distance D1.

As shown in FIG. 8, the freely projecting leading end 23 of the second strip 2 can be further defined by the recessed edge 26 at the bottom surface 22 projecting from the alternative retaining member 205 in or parallel to said projecting direction E over a second projecting distance D2. Said second projecting distance D2 is preferably at least one millimeters, more preferably at least three millimeters and most preferably at least seven millimeters.

FIG. 9 shows the situation in which the alternative retaining member 205 is lowered in the placement direction K until the lower point of the alternative retaining member 205 is spaced apart from the support surface 40 at a chosen minimal height H.

Preferably, the minimal height H is equal to or substantially equal to the height of the strips 1, 2. Said height may be obtained by automatic measurement of the thickness of one of the strips 1, 2 or by manual input in the control unit 6. At said minimal height H, the freely projecting leading end 23 of the second strip 2 projects under the oblique joining angle A towards, onto and/or along the support surface 40. In particular, the contact of the second strip 2 with the support surface 40 causes said leading end 23 can be deflected with respect to the support surface 40 over the first projecting distance D1 into an orientation in which the bevel end surfaces 14, 24 of the first strip 1 and the second strip 2 are parallel or substantially parallel.

In other words, the alternative retaining member 205 is arranged for holding the projected leading end 23 under the oblique joining angle A in such a way that the recessed edge 26 at the bottom surface 22 of the second strip 2 contacts the support surface 40 at the second projecting distance D2 from the alternative retaining member 205. Because of said contact, the freely projecting leading end 23 of the second strip 2 is deformed and/or deflected on said support surface 40 into alignment with the first strip 1 and/or towards the top surface 11 of the first strip 1. Hence, the leading edge 25 of the second strip 2 is aligned with, lies closer to or lies flush with the top surface 11 of the first strip 1, independently from the minimum height H as defined by the alternative retaining member 205. Consequently, the freely projecting leading end 23 of the second strip 2 is no longer subject to any tolerance T in the minimum height H of the alternative retaining member 205.

The first projecting distance D1 and/or the second projecting distance D2 may be preset or manually entered into the control unit 6 such that movements of the alternative retaining member 205 may be configured taking into account said preset first projecting distance D1 and/or the second projecting distance D2.

FIG. 10 shows the situation in which a relative movement between the support member 4 and the alternative retaining member 205 is provided in the joining direction J to bring the leading end 23 of the second strip 2 into contact with the trailing end 13 of the first strip 1 under the oblique joining angle A. During the relative movement, the alternative retaining member 205 is kept in the joining position as in FIGS. 8 and 9. The control unit 6 is arranged for moving the support member 4 and the alternative retaining member 205 relative to each other in the joining direction J until the alternative retaining member 205 in the retaining plane R is at the first projecting distance D1 or slightly less (e.g. a few millimeters less) from the first strip 1. The tacky material of the strip body 20 at the leading end 23 of the second strip 2 will adhere to tacky material of the strip body 10 at the trailing end 13 of the first strip 1 at said leading edge 25.

Due to the deformation of the freely projecting leading end 23 at the leading end 23 of the second strip 2, as shown in FIG. 9, the bevel end surface 24 of the second strip 2 is pressed against the bevel end surface 14 of the first strip 1 in FIG. 10 with the bevel end surfaces 14, 24 being substantially parallel. The tacky material of the strip body 20 at the leading end 23 of the second strip 2 will adhere to tacky material of the strip body 10 at the trailing end 13 of the first strip 1 at said leading edge 25. As shown in FIG. 10 and in more detail in FIG. 19, the leading edge 25 of the second strip 2 lies closer to or lies flush with the top surface 11 of the first strip 1 compared to the prior art situation as shown in FIG. 18. Any remaining height difference between the strips 1, 2 is now smoother and/or less abrupt. In particular, unlike the prior art 'beveled splice' of FIG. 18, there is no sharp leading edge 25 protruding above the first strip 1.

FIG. 11 shows the situation in which the alternative retaining member 205 has been moved from the joining position into a placement position in which the retaining plane R extends parallel or substantially parallel to the support plane S. The control unit 6 is arranged for moving the alternative retaining member 205 only after the leading edge 25 of the second strip 2 has been moved into contact with the trailing end 13 of the first strip 1 in FIG. 10.

Alternatively, the second strip 2 may simply be released from the alternative retaining member 205 in the joining position as shown in FIG. 10, thereby dropping the second strip 2 from the alternative retaining member 205 onto the support surface 40 of the support member 4 under the influence of gravity. An advantage of the dropping is that the alternative retaining member 205 can remain in the same joining position throughout the steps of the method. When the distance to the support surface 40 is relatively small, e.g. a few millimeters, the drop will not negatively affect the quality of the joining.

FIGS. 12 and 13 show the further alternative joining device 203 according to FIGS. 8-11 during the steps of an alternative method according to a fourth embodiment of the invention.

The method according to the fourth embodiment of the invention differs from the previously discussed method only in that the relative movement between the support member 4 and the alternative retaining member 205 is achieved by moving the alternative retaining member 205 in a relative movement M along a joining path G at the oblique joining angle A with respect to the support plane S towards the first strip position P1. Hence, the alternative retaining member 205 is simultaneously moved with a first component M1 in the joining direction J and a second component M2 in the placement direction K. As shown in FIG. 13, the alternative retaining member 205 is moved along oblique joining path G into the same position as in FIG. 10. The joining method can subsequently be completed in the same manner as shown in FIG. 11.

FIGS. 14-17 again show the further alternative joining device 203 according to FIGS. 8-11 during the steps of a further alternative method according to a fifth embodiment of the invention.

The method according to the fifth embodiment of the invention differs from the previously discussed methods only in that the further alternative joining device 203 is used for joining, pressing or splicing a first strip 101 and a second strip 102 having straight end surfaces 114, 124 extending in a direction perpendicular to the respective top surfaces 111, 121 and/or bottom surfaces 112, 122. Hence, instead of forming a so-called 'beveled splice' as in FIGS. 1-13, the method according to the third embodiment of the invention forms a so-called 'butt splice'. Similarly to the previously discussed embodiment, the method according to the fifth embodiment of the invention provides for an oblique joining angle A of the alternative retaining member 205 with respect to the support plane S and a leading end 123 projecting from the alternative retaining member 205 over a projecting distance D that is sufficient to allow the leading end 123 of the second strip 102 deformed and/or deflected on the support surface 40 in substantially the same manner as with the previous embodiment. In particular, the straight end surfaces 114, 124 are arranged to be parallel or substantially parallel at the joining line L. It will be apparent to one skilled in the art that the same joining can also be obtained by using the joining devices 3, 103 of FIGS. 1-7.

Hence, the same advantageous effects can be achieved when using the joining devices 3, 103, 203 of FIGS. 1-13 for joining the alternative strips 101, 102 as shown in FIGS. 14-17.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

In summary the invention relates to a joining device for joining a trailing end of a first strip to a leading end of a second strip to form a tire component, wherein the joining device comprises a support member with a support surface and a retaining member with a retaining surface for retaining the second strip, wherein the joining device is arranged for positioning the leading end of the second strip in a joining orientation in which said leading end is closer to the support plane than the rest, wherein the joining device comprises a control unit for controlling a relative movement between the support member and the retaining member with a first component in a placement direction to place the leading end of the second strip and a second component in a joining direction to bring the leading end of the second strip into contact with the trailing end of the first strip.

The invention claimed is:

1. A joining device for joining a trailing end of a first strip to a leading end of a second strip to form a tire component, wherein the joining device comprises a support member with a support surface configured for supporting the first strip and the second strip in a support plane in a first strip position and a second strip position, respectively, on opposite sides of a joining line and a retaining member with a retaining surface for retaining the second strip in a retaining plane extending above the support plane at the second strip position, wherein the retaining member is configured for retaining the second strip to the retaining surface with the leading end projecting from the retaining member towards the first strip position over a first projecting distance in a projecting direction parallel to the retaining plane, wherein the joining device is configured for positioning the leading end of the second strip in a joining orientation in which said leading end is closer to the support plane than the rest of the second strip, wherein the joining device comprises a control unit configured for controlling a relative movement between the support member and the retaining member, wherein the control unit is arranged for first controlling a first component of the relative movement in a placement direction perpendicular to the support plane to place the leading end of the second strip in the joining orientation in contact with the support plane and subsequently controlling a second component of the relative movement in a joining direction transverse to the joining line and parallel to the support plane to bring the leading end of the second strip in the joining orientation into contact with the trailing end of the first strip.

2. The joining device according to claim 1, wherein the joining device comprises a deflection member configured for deflecting the leading end of the second strip towards the support member with respect to the rest of the second strip.

3. The joining device according to claim 2, wherein the deflection member is movable in a deflection direction transverse or perpendicular to the retaining plane into a deflection position in which the deflection member at least partially protrudes from the retaining plane towards the support plane.

4. The joining device according to claim 2, wherein the deflection member is biased to move into the deflection position, wherein the deflection member is movable against the bias in a retraction direction opposite to the deflection direction into a flush position in which the deflection member lies flush with the retaining plane.

5. The joining device according to claim 3, wherein the joining device comprises a deflection actuator that is operationally coupled to the deflection member for actively driving the movement of the deflection member in the deflection direction.

6. The joining device according to claim 1, wherein the retaining plane is configured to extend parallel to the support plane when the leading end of the second strip is in the joining orientation.

7. The joining device according to claim 1, wherein the retaining member is positionable in an oblique joining position in which the retaining plane extends at an oblique joining angle relative to the support plane and declines towards the joining line.

8. The joining device according to claim 7, wherein the joining angle is in a range of two to six degrees, two to five degrees, or three to four degrees.

9. The joining device according to claim 7, wherein the retaining member in the joining position is spaced apart from the support plane over a minimal height that is chosen such that the second strip contacts the support surface.

10. The joining device according to claim 7, wherein the retaining member is movable from the joining position into a placement position, wherein the retaining plane extends parallel to the support plane in the placement position.

11. The joining device according to claim 10, wherein the control unit is arranged for moving the retaining member from the joining position to the placement position only after the leading end of the second strip is in contact with the trailing end of the first strip.

12. The joining device according to claim 1, wherein the trailing end of the first strip and the leading end of the second strip comprise complementary bevel end surfaces extending under the same bevel angle with respect to the support plane and the retaining plane, respectively, wherein the relative movement between the retaining member and the support member is configured for deflecting the leading end with respect to the support surface over the first projecting distance into the joining orientation in which the bevel end surfaces of the first strip and the second strip are parallel.

13. The joining device according to claim 12, wherein the second strip comprises a top surface, wherein the bevel end surface meets with the top surface to form a leading edge, wherein the retaining member is arranged for retaining the second strip with the leading edge thereof projecting from the retaining member in the projecting direction over the first projection distance.

14. The joining device according to claim 13, wherein the second strip comprises a bottom surface, wherein the bevel end surface meets with the bottom surface to form a recessed edge, wherein the retaining member is configured for retaining the second strip with the recessed edge thereof projecting from the retaining member in the projecting direction over a second projection distance.

15. The joining device according to claim 1, wherein the first projecting distance is at least two millimeters, at least five millimeters or at least ten millimeters.

16. The joining device according to claim 14, wherein the second projection distance is at least one millimeter, at least three millimeters or at least seven millimeters.

17. The joining device according to claim 1, wherein the support member is movable in the joining direction with respect to the retaining member or wherein the retaining member is movable in the joining direction with respect to the support member.

18. A joining device for joining a trailing end of a first strip to a leading end of a second strip to form a tire component, wherein the joining device comprises a support member with a support surface configured for supporting the first strip and the second strip in a support plane in a first strip position and a second strip position, respectively, on opposite sides of a joining line and a retaining member with a retaining surface for retaining the second strip in a retaining plane extending above the support plane at the second strip position, wherein the retaining member is configured for retaining the second strip to the retaining surface with the leading end projecting from the retaining member towards the first strip position over a first projecting distance in a projecting direction parallel to the retaining plane, wherein the joining device is configured for positioning the leading end of the second strip in a joining orientation in which said leading end is closer to the support plane than the rest of the second strip, wherein the joining device comprises a control unit for controlling a relative movement between the support member and the retaining member, wherein the control unit is configured for controlling a first component of the relative movement in a placement direction perpendicular to the support plane to place the leading end of the second strip in the joining orientation in contact with the support plane and simultaneously controlling a second component of the relative movement in a joining direction transverse to the joining line and parallel to the support plane to bring the leading end of the second strip in the joining orientation into contact with the trailing end of the first strip.

19. The joining device according to claim 18, wherein the retaining member is positionable in an oblique joining position in which the retaining plane extends at an oblique joining angle relative to the support plane and declines towards the joining line.

20. A method for joining a trailing end of a first strip to a leading end of a second strip to form a tire component, wherein the method comprises the steps of:
providing a support member with a support surface and supporting the first strip in a support plane on the support surface in a first strip position on one side of a joining line;
providing a retaining member with a retaining surface and retaining the second strip to said retaining surface in a retaining plane extending above a second strip position at the support plane on an opposite side of the joining line, wherein the second strip is retained to the retaining surface with the leading end projecting from the retaining member towards the first strip position over a first projecting distance in a projecting direction parallel to the retaining plane;

positioning the leading end of the second strip in a joining orientation in which said leading end is closer to the support plane than the rest of the second strip; and controlling a relative movement between the support member and the retaining member, wherein the relative movement is first controlled in a placement direction perpendicular to the support plane to place the leading end of the second strip in the joining orientation in contact with the support plane and is subsequently controlled in a joining direction transverse to the joining line and parallel to the support plane to bring the leading end of the second strip in the joining orientation into contact with the trailing end of the first strip.

21. The method according to claim 20, wherein the method comprises the step of deflecting the leading end of the second strip towards the support member with respect to the rest of the second strip.

22. The method according to claim 20, wherein the retaining plane extends parallel to the support plane when the leading end of the second strip is in the joining orientation.

23. The method according to claim 20, wherein the retaining member is positioned in an oblique joining position in which the retaining plane extends at an oblique joining angle relative to the support plane and declines towards the joining line.

24. A method for joining a trailing end of a first strip to a leading end of a second strip to form a tire component, wherein the method comprises the steps of:

providing a support member with a support surface and supporting the first strip in a support plane on the support surface in a first strip position on one side of a joining line;

providing a retaining member with a retaining surface and retaining the second strip to said retaining surface in a retaining plane extending above a second strip position at the support plane on an opposite side of the joining line, wherein the second strip is retained to the retaining surface with the leading end projecting from the retaining member towards the first strip position over a first projecting distance in a projecting direction parallel to the retaining plane;

positioning the leading end of the second strip in a joining orientation in which said leading end is closer to the support plane than the rest of the second strip (2, 102); and controlling a relative movement between the support member and the retaining member, wherein the relative movement is controlled in a placement direction perpendicular to the support plane to place the leading end of the second strip in the joining orientation in contact with the support plane and is simultaneously controlled in a joining direction transverse to the joining line and parallel to the support plane to bring the leading end of the second strip in the joining orientation into contact with the trailing end of the first strip.

25. The method according to claim 24, wherein the retaining member is positioned in an oblique joining position in which the retaining plane extends at an oblique joining angle relative to the support plane and declines towards the joining line.

* * * * *